United States Patent Office 3,267,068
Patented August 16, 1966

3,267,068
POLYALDEHYDE COMPOSITIONS CONTAINING A MONOAMINONAPHTHALENE AND A TRIALKYL PHOSPHITE
Eli Perry, Galveston, Tex., assignor to Monsanto Company, St. Louis, Mo., a corporation of Delaware
No Drawing. Filed Oct. 18, 1962, Ser. No. 231,551
1 Claim. (Cl. 260—45.9)

The present invention relates to the stabilization of high polymers of aldehydes. More particularly, it relates to the stabilization of polyaldehydes against deterioration at high temperatures with a novel synergistic combination of stabilizers.

It is known that aldehydes such as acetaldehyde, propionaldehyde, acrolein, methacrolein and substituted methacroleins, and the like can be polymerized to yield acetal-type polymers of high molecular weight having molecular chains consisting of a succession of alternate carbon atoms and oxygen atoms as represented by the structural formula

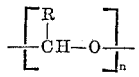

wherein R is an unsubstituted or a substituted hydrocarbon radical. The utility of these polymers, however, is seriously limited by reason of their instability. The polymers are readily subject to degradation via several different mechanisms: thermal depolymerization initiated at the ends of the polymers molecules; thermal decomposition at elevated temperatures with reformation of the monomeric aldehyde; oxidative attack by oxygen or free radicals having an oxidative tendency; and acid cleavage often brought about by residual traces of the acid catalyst employed in the preparation of the polymer.

Stabilization of the polyaldehydes can be effected by reacting the polymers to tie up the end groups. For example, the polymers can be esterified by reacting them with carboxylic acid anhydrides, preferably acetic anhydride, in the presence of acid-binding substances. These processes, however, are complicated and expensive and the end product is still unstable by virtue of its fundamental polymer chain structure. Another method of protecting the polymeric materials against attack whether the end groups have been reacted or not is by the addition or incorporation of organic compounds as stabilizers in the polyaldehydes. Recently, certain novel classes of stabilizers have been found which can be incorporated into polyaldehydes to produce compositions which are more stable than the polyaldehydes alone and consequently more useful. Now it has been discovered that particular combinations of these stabilizers impart to the polyaldehydes a very high degree of stability to deterioration at elevated temperatures. This improved stability is substantially greater than the additive effect of the individual compounds comprising the stabilizer combination. Hence, the stabilizer combination is referred to as a "synergistic" combination.

It is a particular object of the present invention to provide a novel synergistic combination of stabilizers for polyaldehydes. It is another object of the invention to provide novel polyaldehyde compositions which are stabilized against the degradative effects of heat by means of a synergistic combination of compounds.

These and other objects and advantages of the invention which will become apparent from the following description thereof are accomplished by incorporating in or intimately admixing with a polyaldehyde a minor amount of a stabilizer combination comprising a monoaminonaphthalene and a trialkyl phosphite. Compositions comprising a polyaldehyde and a minor amount of a stabilizer combination comprising a monoaminonaphthalene and a trialkyl phosphite exhibit a high degree of resistance to degradation or deterioration when subjected to elevated temperatures.

The monoaminonaphthalenes suitable for use as one of the components of the stabilizer combinations of the invention are either 1-aminonaphthalene, 2-aminonaphthalene, or derivatives thereof such as 1-amino-2-methylnaphthalene, 1-amino-3-hydroxy-naphthalene, 2-amino-6-ethylnaphthalene, 2-amino-1-chloronaphthalene, 1-amino-2-methoxynaphthalene, 2-amino-1-phenylnaphthalene, 2-amino-1-nitronaphthalene, and the like.

Any trialkyl phosphite in which the alkyl groups contain from 1 to 20 carbon atoms can be employed as the second component in the stabilizer combination of the invention. Representative examples of suitable compounds include trimethyl phosphite, tributyl phosphite, trihexyl phosphite, methyl diethyl phosphite, propyl dimethyl phosphite, trinonyl phosphite, tridodecyl phosphite, dioctyl nonyl phosphite, trihexadecyl phosphite, trioctadecyl phosphite, and the like. The preferred stabilizer combination is that comprising 2-aminonaphthalene and trioctadecyl phosphite.

The amount of the stabilizer combination of the invention employed can be varied widely depending upon the particular polyaldehyde to be stabilized and the degree of stabilization desired. Generally, amounts from as little as 0.01% by weight to as much as 20 to 25% by weight of the polymer can be employed. For most practical purposes, amounts from about 0.01% to about 15% are satisfactory with amounts from about 3% to about 6% being preferred. The weight ratios of the two components of the synergistic stabilizer combination likewise can be varied. Generally, the combination of the two stabilizer components at a weight ratio of monoaminonaphthalene to trialkyl phosphite in the range of 1:100 to 100:1 are utilized and preferably these components are employed in a weight ratio in the range from 1:10 to 10:1.

The synergistic stabilizer combination can be incorporated in the polymer in any of several ways with the two components being incorporated either separately or together. Generally, incorporation is effected by intimately admixing a solution of the stabilizer combination in a volatile solvent with the finely divided polymer and thereafter evaporating the solvent, preferably under reduced pressure. As an alternative method, both the polymer and the stabilizer combination can be dissolved in a comon solvent and the solvent then evaporated. Or, a mutual solution of the stabilizer combination and the polyaldehyde can be made and the mixture then precipitated from the solution by the addition of water or some other non-solvent for the resin and stabilizer combination. Also, the admixture may be effected by dry blending of the stabilizer combination and the polymer on mill rolls. In still another method, the stabilizer combination can be added to the polymerization system before or after the polymer has formed but before isolation of the polymer.

The polyaldehydes which can be thermally stabilized according to the invention with a mixture comprising a monoaminonaphthalene and a trialkyl phosphite include all those obtained by polymerization of aldehydes of the formula R—CHO wherein R can be an alkyl, a cycloalkyl, and alkenyl, an alkynyl, an aryl, an aralkyl, or an alkaryl radical. The stabilizer combination is particularly useful with polyaldehydes derived from saturated aliphatic aldehydes containing from 2 to 10 carbon atoms and more especially from 2 to 7 carbon atoms. Specific examples of suitable aldehyde monomers include acetaldehyde, propionaldehyde, butyraldehyde, valeraldehyde, heptaldehyde, and the like; acrolein, methacrolein, substituted methacroleins such as tiglic aldehyde, crotonaldehyde, and the like; propargyl aldehyde; benzaldehyde, p-tolualdehyde, p-isopropylbenzaldehyde, cinnamaldehyde, phenylacetaldehyde, and the like. Other polyaldehydes with which the stabilizer combinations are useful include those derived from dialdehydes such as glyoxaldehyde, succinaldehyde, malealdehyde, glutaraldehyde, and the like; substituted aldehydes such as chloral, aldol, and the like; and heterocyclic aldehydes such as furfural and tetrahydrofurfural. The stabilizer combinations of the invention are likewise useful with copolymers prepared by copolymerizing the foregoing aldehydes with each other and/or with oxy-aldehydes, ether-aldehydes, amino-aldehydes, and halogenated aldehydes or with other polymerizable vinyl monomers, epoxides, ketones, and the like.

The compositions of the invention may also include, if desired, plasticizers, fillers, pigments, anti-oxidants, and other stabilizers such as stabilizers against degradation caused by ultraviolet light.

The following example is presented to illustrate the invention but is not to be construed as limiting it in any manner whatsoever. The property of thermal stability which is used in evaluating the effect of the polyaldehyde stabilizer combinations is defined by the value of the reaction rate constant for the thermal degradation of the polymer at a particular elevated temperature, namely, 190° C. It is well known that chemical reactions may be classed as first order, second order, third order, etc., depending on the number of molecules which enter into or are formed by the reaction. It is also known that the decomposition or degradation of a material following a first order reaction can be expressed mathematically in the form of the differential equation:

$$-\frac{dw}{dt} = kw$$

in which $t$ is the elapsed time from the beginning of the decomposition reaction, $w$ is the weight of the material which remains undecomposed at time $t$, and $k$ is a rate constant for the equation. The thermal degradation of the polyaldehyde polymers of this invention has been found to conform generally to a first order reaction which can be expressed by the above equation. The value of $k$ in this equation, therefore, is utilized to characterize the polymers with respect to thermal stability. The lower the numerical value obtained for this constant, the more stable is the polymer.

*Example*

Polypropionaldehyde was prepared by polymerizing propionaldehyde at a temperature of −76° C. in n-hexane as the reaction medium and in the presence of about 9.8% by weight (based on propionaldehyde of triethylaluminum as catalyst. A portion of the polymer was then stabilized with a mixture consisting of 2-aminonaphthalene and trioctadecyl phosphite in a weight ratio of 1:1 and subjected to a stabilization test. The procedure for stabilizing and testing was as follows:

A weighed portion of the polymer was placed in a tared 25-cc. Erlenmeyer flask. Toluene (1 cc.) was added to the flask and the polymer was allowed to swell for about 3 hours. Solutions of 2-aminonaphthalene and trioctadecyl phosphite in toluene of a concentration such as to yield upon drying 3.0% by weight of each of these compounds were then added and the polymer was allowed to soak therein for about 3 hours. At the end of this time, the solvent was evaporated at 25° C. under vacuum. The flask was then purged for about five minutes with argon at a rate of about 250 cc. per minute. The argon flow was reduced to about 5–10 cc. per minute and the flask was immersed in an oil bath maintained at 190± 1° C. for five minutes while the argon purge was maintained at the slow rate. At the end of this time, the flask was removed from the bath, cooled under argon and weighed to determine any loss in weight. From the weight loss, the percent residue was determined. The first order rate constant, $k$, was calculated from the data obtained.

For comparative purposes, a sample of the polypropionaldehyde containing no stabilizer, one containing 6% by weight of 2-aminonaphthalene alone and another containing 6% by weight of trioctadecyl phosphite alone were subjected under an argon atmosphere to the elevated temperature of the oil bath and the $k$ values for thermal degradation of these polymer compositions were determined in the same manner. Results of these tests tabulated below demonstrate clearly that the combination of 2-aminonaphthalene and trioctadecyl phosphite is a combination which has a stabilizing effect greater than the additive or aggregative effect of these individual stabilizers.

| Stabilizer (percent by wt.): | $k_{190°\,C.}$ |
|---|---|
| None | 0.56 |
| 6% 2-aminonaphthalene | 0.10 |
| 6% trioctadecyl phosphite | 0.090 |
| 3% 2-aminonaphthalene+3% trioctadecyl phosphite | 0.074 |

What is claimed is:

A thermally-stabilized polymeric composition comprising polypropionaldehyde and from about 3% to about 6% by weight of said polypropionaldehyde of a synergistic combination comprising 2-aminonaphthalene and trioctadecyl phosphite in a weight ratio of about 1:1.

References Cited by the Examiner

UNITED STATES PATENTS

| 2,376,354 | 5/1945 | Gresham | 260—45.9 |
| 2,729,691 | 1/1956 | DePree | 260—45.9 |
| 2,972,596 | 2/1961 | Newland et al. | 260—45.95 |
| 3,039,993 | 6/1962 | Friedman | 260—45.8 |
| 3,131,165 | 4/1964 | Hermann et al. | 260—45.9 |
| 3,159,599 | 12/1964 | Meek | 260—45.75 |

FOREIGN PATENTS

| 565,815 | 11/1958 | Canada. |
| 108,095 | 7/1958 | Pakistan. |

OTHER REFERENCES

Neureiter et al.: "Synergism Between Phenols and Sulfides in the Stabilization of Polyolefins to Oxidation," I&EC Product Research and Development, December 1962, pages 236–239 relied on.

LEON J. BERCOVITZ, *Primary Examiner.*

F. McKELVEY, *Assistant Examiner.*